Jan. 3, 1956  F. LEISTER  2,729,479
LOCKING MEANS
Filed June 21, 1950

Inventor
FAYETTE LEISTER
By Mitchell & Bechert
Attorneys

United States Patent Office 2,729,479
Patented Jan. 3, 1956

2,729,479
LOCKING MEANS

Fayette Leister, New Britain, Conn., assignor to The Fafnir Bearing Company, New Britain, Conn., a corporation of Connecticut Application June 21, 1950, Serial No. 169,447

6 Claims. (Cl. 287—52.09)

My invention relates to locking means for securely mounting a bearing ring or the like.

It is an object of the invention to provide improved means of the character indicated.

It is another object to provide improved locking means involving a minimum of additional axial length to an assembled bearing or the like.

It is a specific object to provide a wire lock for securing an inner bearing ring to a shaft.

It is a general object to meet the above objects with a simple construction involving a minimum of construction expense, a maximum of locking effectiveness, and simplicity of use.

Other objects and various further features of novelty and invention will be pointed out or will occur to those skilled in the art from a reading of the following specification in conjunction with the accompanying drawings. In said drawings, which show, for illustrative purposes only, a preferred form of the invention:

Figure 1:
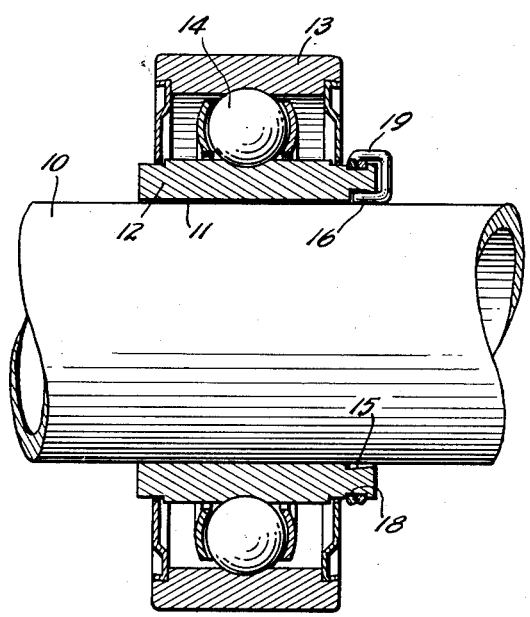
Fig. 1 is a longitudinal sectional view of an antifriction bearing to be secured to a shaft by means incorporating features of the invention.
Figure 2:
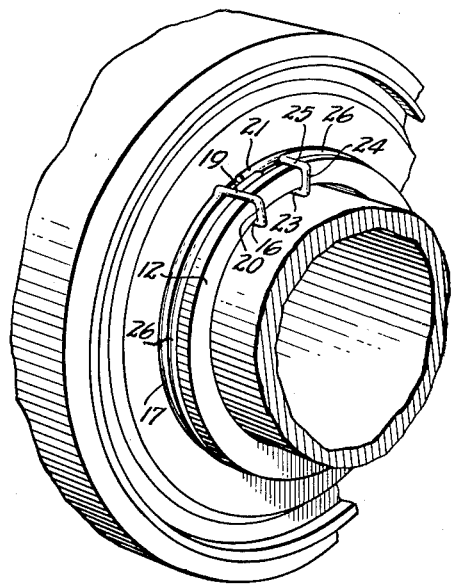
Fig. 2 is a fragmentary perspective view of the locking end of the assembly of Fig. 1.

Briefly stated, my invention contemplates a relatively simple locking means to securely mount a bearing ring, as in the case of locking an inner bearing ring or the like to a shaft. The bearing ring may include at one axial end a surface eccentric to the ring axis, and the locking means may include a wire with a portion extending generally axially and to be wedged against this eccentric surface. In the form to be described, the eccentric surface is an eccentric counterbore and the locking means is wholly of wire, with a portion extending generally axially to be squeezed between the counterbore and a shaft in order to establish a locked setting of the bearing on the shaft. In addition to the portion utilized for locking, the wire may include a body of suitable formation to be carried and retained by the bearing ring.

Referring to the drawings, my invention is shown in application to an antifriction bearing mounted upon a shaft 10. The shaft is received in the bore 11 of an inner bearing ring 12, and an outer bearing ring 13 is supported in spaced relation to the inner bearing ring 13 by means of a plurality of antifriction elements 14. The bearing ring 12 may include at one axial end thereof an eccentric locking surface 15, and in the form shown this surface is an eccentric counterbore.

In accordance with the invention, I provide means including a generally axially extending wire portion 16 to be received between the counterbore and the shaft and of sufficient thickness to be jammed between the counterbore and the shaft upon relative rotation of the parts. The jam will be appreciated as effectively locking the inner bearing ring or the like 12 upon the shaft 10. Thus, for the form shown, I prefer that the thickness of the wire portion 16 shall be intermediate the maximum and minimum radial clearance be received between the counterbore and the shaft and of sufficient thickness to be jammed between the counterbore and the shaft upon relative rotation of the parts. The jam will be appreciated as effectively locking the inner bearing ring or the like 12 upon the shaft 10. Thus, for the form shown, I prefer that the thickness of the wire portion 16 shall be intermediate the maximum and minimum radial clearance of the counterbore surface 15 with the shaft 10.

For convenience in use, suitable supporting means may be provided for the generally axially projecting locking portion 16, and in the form shown I employ circumferentially extending means, which may be carried by the inner bearing ring. The circumferentially extending means may simply be a further continuation of the wire from which the locking portion 16 is formed.

Stated in other words, the locking portion 16 may be formed as a part of or at least at one end of a generally circumferential loop or body 17 of wire. For retaining purposes, the loop 17 may be received in a circumferential groove 18 in the inner bearing ring 12. Thus, the end of loop 17 which carries the locking portion 16 may be formed with a first generally axially extending portion 19 contiguous to the body of loop 17; next, a generally radially directed portion 20 may be formed contiguous to the first axially projecting portion 19; lastly, the locking portion 16 may be considered a second generally axially extending portion contiguous to the generally radially extending portion 20 and projecting toward the general plane of the body or loop 17.

Figure 3:
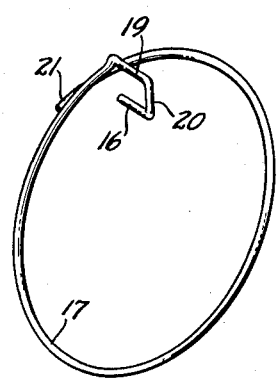
Fig. 3 is a perspective view of locking means shown in Fig. 1.

I prefer that the body or loop 17 shall always be resiliently stressed when seated in the retainer groove 18 on the inner bearing ring. Thus, I prefer that when initially formed, that is, in the unstressed stated, the end 21 of the retaining means (which end is not used for locking purposes) shall circumferentially overlap part of the rest of the body 17, as shown in Fig. 3. If, then, the diameter of the groove 18 exceeds the unstressed diameter of the locking means 17, it will be understood that in application to the bearing ring 12 the loop 17 will be spread open so that it may uniformly resiliently enwrap the inner bearing ring and thus hold itself in place in the retaining groove 18.

It will be appreciated that with an eccentric locking means, such as the counterbore 15, a locking or bind may be achieved one side or the other of the location of maximum radial clearance between the counterbore and the shaft. The desired side (of this maximum-clearance location) upon which to establish the bind will of course depend upon the direction of rotation of the bearing with respect to the shaft when in use. In order to contemplate such relative rotation in both directions, I prefer to employ my locking means in duplicate so that one generally axially extending portion 16 may be employed for locking one side, that is, for one direction of relative rotation, and so that another generally axially directed locking portion 23 may be employed for locking on the other side, that is, for relative rotation in the opposite direction.

Figure 4:
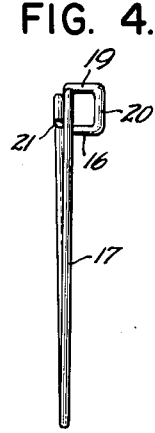
Fig. 4 is a longitudinal elevation of the locking means of Fig. 3.

The second locking portion 23 may be formed on another locking ring of generally the same configuration as that which has been described and shown in Figs. 3 and 4. Thus, the means for supporting the locking portion 23 may include a generally radially extending portion 24 to span the end face of the bearing ring 12, and this means may further include a generally axially projecting portion 25 and a loop or body 26 to be accommodated in the groove 18. It will be apreciated that the retaining groove 18 may be of sufficient axial width to accommodate both the adjacent loop bodies 17—26 and that the axial offsets provided by the portion 19 of ring 17 and by the portion 25 of ring 26 may be suitably proportioned so that both radially extending portions 20—24 may hug or lie substantially adjacent the end face of the bearing ring 12. The locking means may thus involve substantially no increase in the overall axial length of an assembled bearing.

In use, I prefer to assemble the two locking rings 17—26 to the inner bearing ring with the radially extending portions 20—24 substantially adjacent one another and at the point of maximum counterbore clearance with the shaft. Upon application to the shaft, the locking portions 16—23 will then not interfere with the free placement of the ring 12 on the shaft. Once the desired axial location has been reached, one may with his fingernails or with a suitable tool, such as a screwdriver, merely angularly push or slide the locking rings in opposite directions until they each produce an initial binding engagement, that is, until they each jam lightly between the counterbore and the shaft. Reliance can then be made upon the natural tendency of an inner bearing ring to creep around a shaft in order to provide the next relative rotation of the parts for establishment of a secure bind.

It will be appreciated that I have described relatively simple locking means for securing a bearing ring or the like to a shaft or other mounting means. The locking means may be cheaply fabricated, is simple to use, and results in virtually no increase in overall dimensions of an assembled bearing. Furthermore, the locking means may be made unit-handling with the assembled bearing.

While I have described my invention in detail for the preferred form shown, it will be understood that modifications may be made within the scope of the invention as defined in the appended claims.

I claim:

1. In a ring locking means, an inner bearing ring or the like to be secured to a shaft and having a bore therein in which to accommodate a shaft, said ring having an eccentric counterbore at one end of said bore, and locking means including a resilient wire ring on the outer surface of said first ring, said wire ring having a generally axially directed portion fitting in and against said counterbore, whereby upon relative rotation of said rings said axially directed portion will be jammed between the shaft and the counterbore in order to lock said inner bearing ring or the like upon a shaft.

2. As an article of manufacture, a locking wire ring for the purpose described, comprising a wire in the general form of a circle, one end of said wire having a first generally axially projecting integral portion, with a generally radially projecting portion continuous and integral with the axially projecting portion, and with a second generally axially projecting portion continuous and integral with the generally radially projecting portion, said second axially projecting portion projecting back toward the plane of the said circle.

3. As an article of manufacture, a locking wire ring for the purpose described, comprising a wire in the general form of a circle, one end of said wire having a first generally axially projecting integral portion, with a generally inwardly radially projecting portion continuous and integral with the axially projecting portion, and with a second generally axially projecting portion continuous and integral with the generally radially projecting portion, said wire in the form of a circle being resilient and having the ends free of each other, said second axially projecting portion projecting back toward the plane of said circle, whereby when said wire is applied to a surface of larger diameter than the normal diameter of said circle said wire will resiliently and substantially circumferentially continuously wrap the surface to which it is applied.

4. In a ring locking means, an inner-bearing-ring member or the like having a bore to receive a shaft member and having an eccentric locking counterbore a one end of said bore, and locking means including two resilient wire locking rings, each wire ring comprising a generally circular body wrapped around and embracing said bearing ring and being integrally formed with a generally axially projecting means received against the surface of said counterbore, whereby the axially projecting means of said wire rings will be jammed between said counterbore and a shaft in said bore to lock against relative rotation of the bearing-ring and shaft members.

5. The combination of claim 4, in which said inner-bearing-ring member has a peripheral groove in which both said generally circular resilient wire bodies are seated and axially located, whereby said inner-bearing-ring member and said locking means may be unit-handling.

6. In a ring locking means, an anti-friction bearing ring having axially extending inner and outer generally cylindrical surfaces, one of said surfaces including an eccentric locking surface at one end thereof, the other of said surfaces having a wire-retaining circumferentially extending groove therein, and a locking wire comprising a loop to snap in said groove and having a portion extending around said one end of said bearing ring and projecting axially over and against a part of said eccentric surface to be wedged between said eccentric surface and a cylindrical surface of a mounting member with which said bearing ring is to be assembled.

References Cited in the file of this patent

UNITED STATES PATENTS

| | | |
|---|---|---|
| 576,665 | Farrar | Feb. 9, 1897 |
| 1,016,620 | Gapp | Feb. 6, 1912 |
| 1,147,240 | Haynes | July 20, 1915 |
| 1,220,185 | Cathcart | Mar. 27, 1917 |
| 1,788,891 | Runge | Jan. 13, 1931 |
| 1,909,230 | Smith | May 16, 1933 |
| 2,102,375 | Morton | Dec. 14, 1937 |
| 2,269,132 | Soderqvist | Jan. 6, 1942 |
| 2,402,318 | Edwards | June 18, 1946 |